(12) United States Patent
Divisi

(10) Patent No.: US 12,297,958 B2
(45) Date of Patent: May 13, 2025

(54) LUBRICANT METERING DEVICE

(71) Applicant: DROPSA S.p.A., Milan (IT)

(72) Inventor: Walter Divisi, Monaco (MC)

(73) Assignee: DROPSA S.p.A., Milan (IT)

( * ) Notice: Subject to any disclaimer, the term of this patent is extended or adjusted under 35 U.S.C. 154(b) by 0 days.

(21) Appl. No.: 18/376,072

(22) Filed: Oct. 3, 2023

(65) Prior Publication Data
US 2024/0110667 A1    Apr. 4, 2024

(30) Foreign Application Priority Data

Oct. 4, 2022    (IT) .......................... 102022000020382

(51) Int. Cl.
| | | |
|---|---|---|
| *F16N 25/02* | (2006.01) | |
| *F16N 7/38* | (2006.01) | |
| *F16N 25/00* | (2006.01) | |
| *F16N 27/00* | (2006.01) | |

(52) U.S. Cl.
CPC .............. *F16N 25/02* (2013.01); *F16N 27/00* (2013.01)

(58) Field of Classification Search
CPC ........ F16N 27/00; F16N 27/005; F16N 25/02; F16N 2270/26; F16N 2270/20; F16N 7/385; F16N 25/00
See application file for complete search history.

(56) References Cited

U.S. PATENT DOCUMENTS

| | | | |
|---|---|---|---|
| 4,079,866 A | 3/1978 | Asioli | |
| 8,196,709 B2* | 6/2012 | Paluncic | ................. F16N 25/02 |
| | | | 184/7.4 |
| 11,566,749 B2* | 1/2023 | Eisses | ..................... F16N 7/385 |
| 2003/0089553 A1* | 5/2003 | Conley | ................... F16N 27/00 |
| | | | 184/7.4 |
| 2005/0258004 A1* | 11/2005 | Paluncic | ................. F16N 11/08 |
| | | | 184/7.4 |
| 2008/0289906 A1 | 11/2008 | Przybylsky | |
| 2009/0193965 A1 | 8/2009 | Paluncic et al. | |
| 2010/0206667 A1 | 8/2010 | Paluncic et al. | |

(Continued)

FOREIGN PATENT DOCUMENTS

| | | | | |
|---|---|---|---|---|
| CN | 214580374 U | 11/2021 | | |
| WO | WO-2013170278 A1 * | 11/2013 | ............. | F16N 25/02 |
| WO | WO-2023055722 A1 * | 4/2023 | ............. | F16N 11/00 |

*Primary Examiner* — Henry Y Liu
*Assistant Examiner* — Katelynne R Burrell
(74) *Attorney, Agent, or Firm* — Dickinson Wright PLLC; Andrew D. Dorisio

(57) ABSTRACT

A lubricant metering device includes a cup-shaped body with a supply passage coupled to a valve element, a hollow tubular body with a free end facing the valve element, a piston slidingly sealed inside the cup-shaped body and along an external surface of the tubular body, an elastic element exerting a load on the piston towards the supply passage, delineating an accumulation chamber facing the valve element and a dispensing chamber in constant communication with the cavity of the tubular body, also in communication with a delivery passage, the valve element closing the free end of the tubular body, isolating the cavity from the accumulation chamber and allowing communication with the supply passage, or isolating the accumulation chamber from the supply passage and allowing communication with the cavity. A stop limits the piston stroke towards the elastic element to adjust the dispensing of lubricant.

11 Claims, 5 Drawing Sheets

(56) References Cited

U.S. PATENT DOCUMENTS

| | | | |
|---|---|---|---|
| 2013/0092475 A1* | 4/2013 | Arens | F16N 27/00 |
| | | | 184/7.4 |
| 2019/0195423 A1* | 6/2019 | Edler | F16N 7/38 |
| 2025/0003550 A1* | 1/2025 | Ebben | F16N 25/02 |

* cited by examiner

LUBRICANT METERING DEVICE

This application claims priority to Italian Patent Application for Invention No. 102022000020382 filed on Oct. 4, 2022, the disclosure of which is incorporated herein by reference.

FIELD OF THE INVENTION

The present invention relates to a lubricant metering device.

In particular, the invention refers to a metering device that exploits the cyclical pressure changes in a lubricant supply line to dispense a predetermined amount of lubricant, at each dispensing cycle, to a user.

BACKGROUND ART

Commonly known metering devices (also known as single-line dispensing valves) such as those marketed by Dropsa S.p.A. under the name 33v are configured to meter out a predetermined amount of fluid at each activation cycle.

The activation cycle is controlled by the cyclical pressure of a lubricant supply line, which can change from 1 to (typically) 20 bar repetitively.

These devices are perfectly functional but require very careful design of the lubrication system, with different valve models for each flow rate required.

Indeed, prior to use it is necessary to know the amounts of lubricant required by each user, in order to arrange the system with metering valves that dispense the exact amount of lubricant required.

Once the layout of the system and the relative amounts to be dispensed have been established, it is difficult to change them.

SUMMARY OF THE INVENTION

The object of the present invention is to provide a metering device which is improved with respect to the prior art.

A further object of the present invention is to provide a metering device which is more flexible than the commonly known devices and can be optimised to the needs of each user.

A still further object of the present invention is to provide a metering device which allows precise adjustment of the amount of lubricant dispensed at each cycle.

This and other objects are achieved by means of a metering device produced according to the technical teachings of the claims annexed hereto.

Advantageously, the metering device is very flexible as it allows the supply of lubricant to be deactivated, even temporarily, for example on machine tools with optional axes.

BRIEF DESCRIPTION OF THE FIGURES

Further features and advantages of the innovation will become clearer in the description of a preferred but not exclusive embodiment of the metering device, illustrated—by way of a non-limiting example—in the drawings annexed hereto, in which.

DETAILED DESCRIPTION OF THE INVENTION

With reference to the figures stated, dispenser 110 is shown comprising five metering devices denoted with the reference number 1.

Indeed, the dispenser 110 features a shared frame 5 which supports and delineates certain functional parts of each device.

Figure 7:
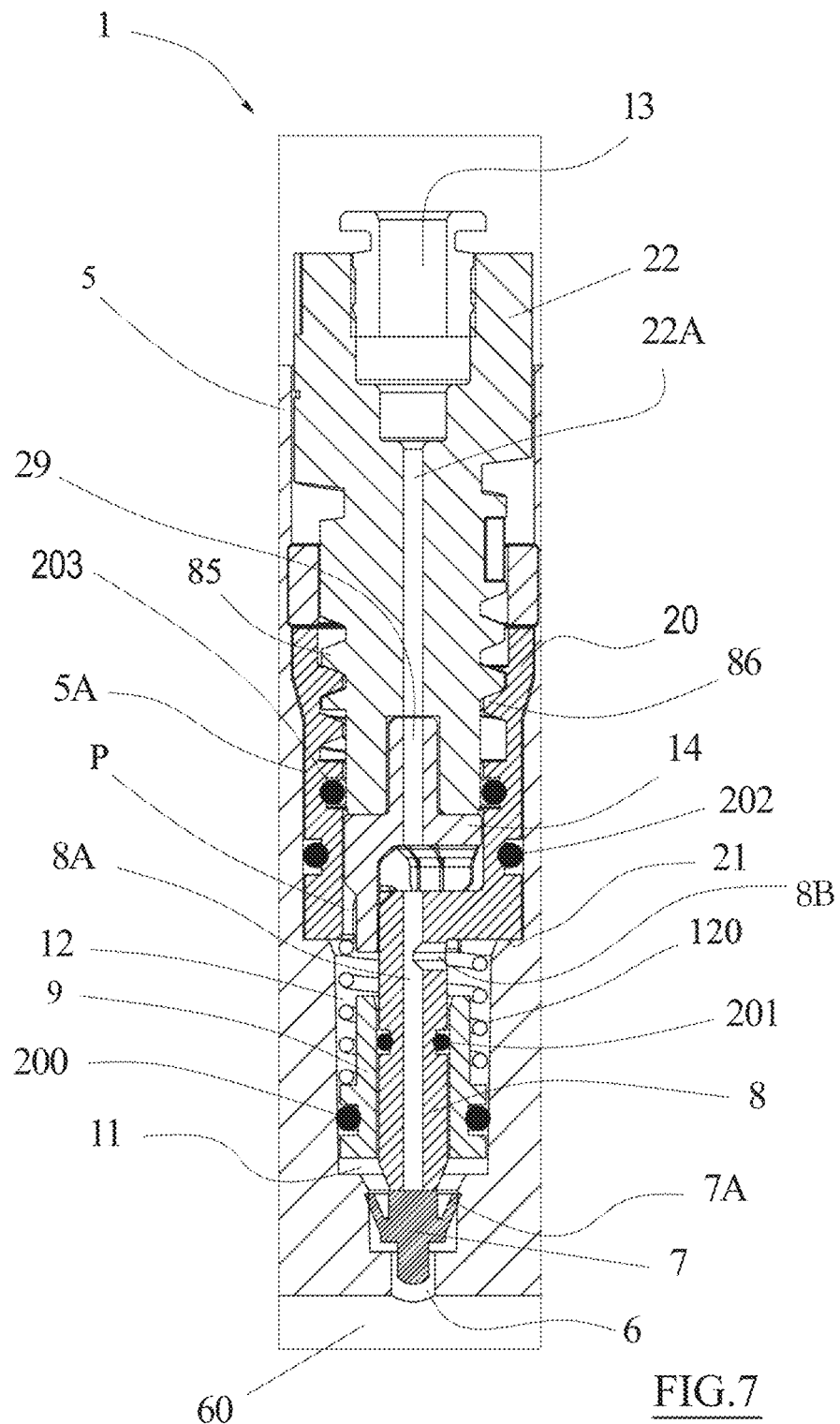
FIG. 7 is an enlargement of the part shown in the rectangle in FIG. 3.
Figure 8:
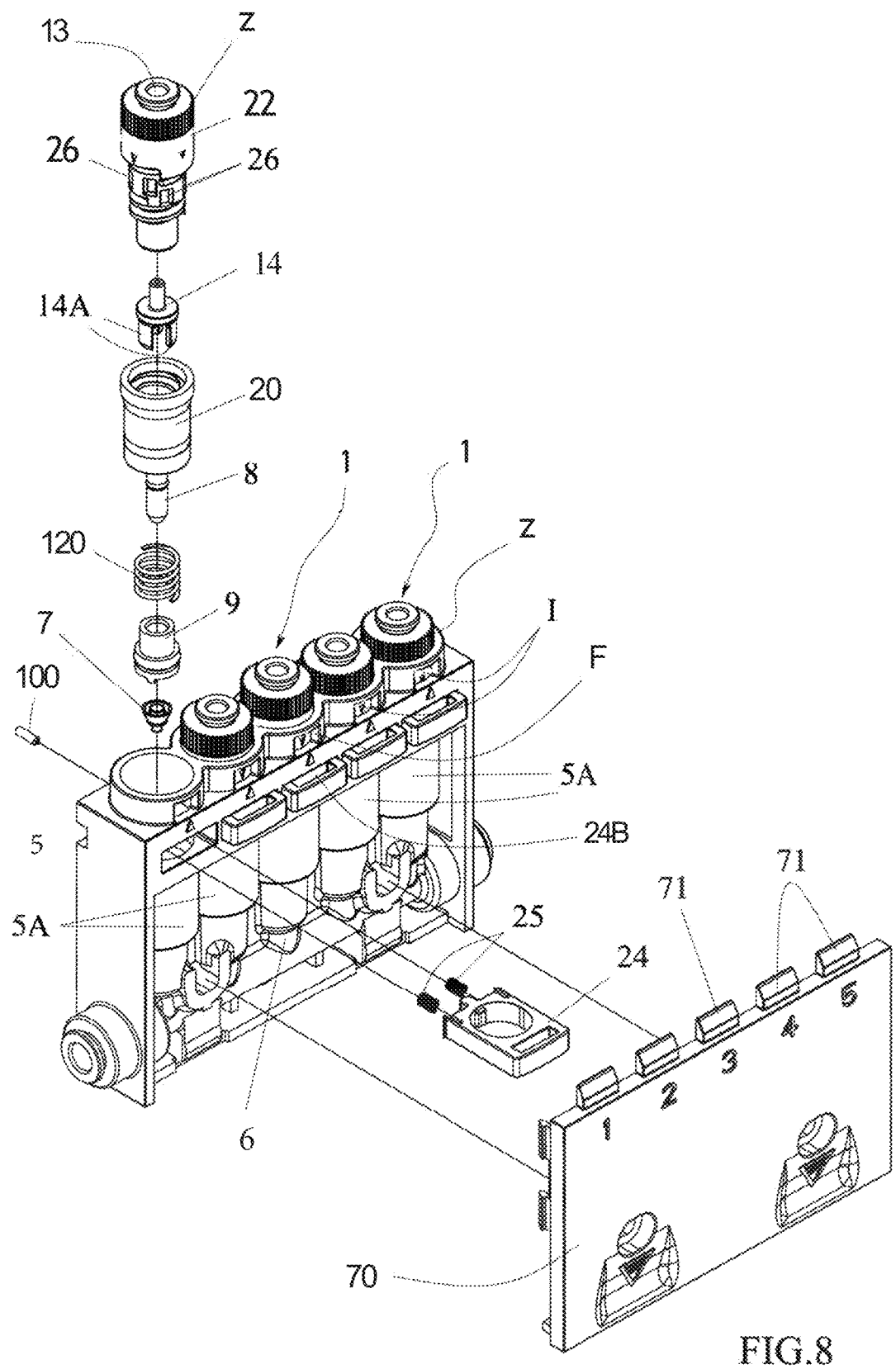
FIG. 8 is an exploded view of the dispenser in FIG. 1.

With reference to FIG. 7, the lubricant metering device 1 comprises a frame 5 which, according to this embodiment, defines at least one cup-shaped body 5A on the bottom of which a lubricant supply passage 6 is provided.

In the configuration illustrated, the passage 6 communicates directly with a supply channel 60 connected, via appropriate pipes, to a lubricant pump which supplies the dispenser with a flow of lubricant with cyclical pressure.

Figure 1:
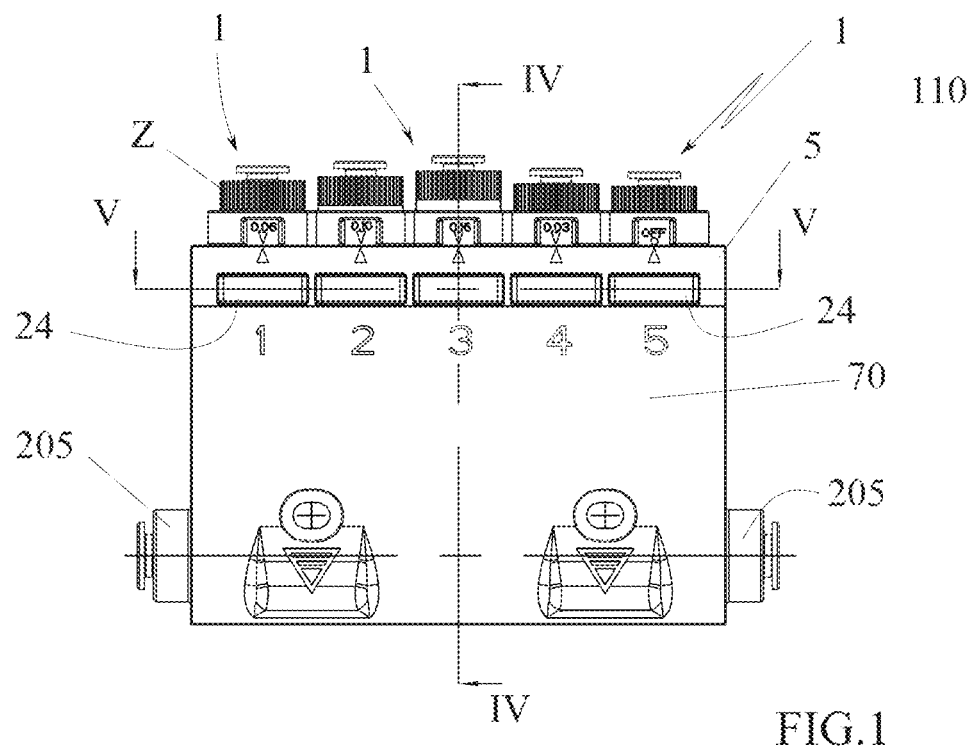
FIG. 1 is a front view of a dispenser comprising five metering devices according to the present invention.
Figure 2:
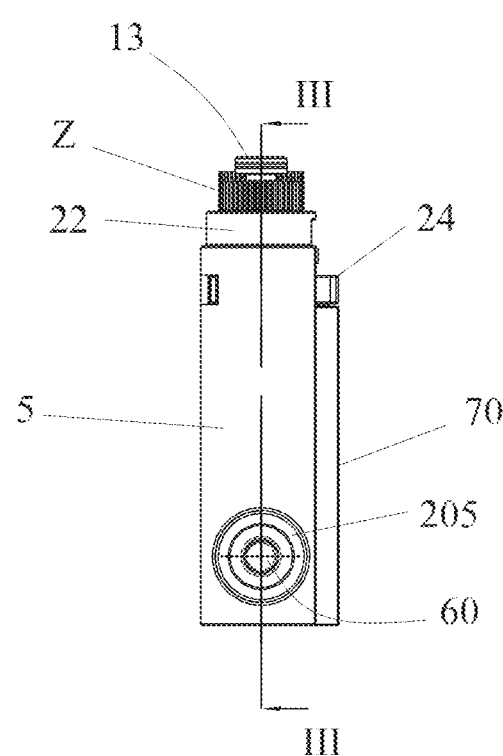
FIG. 2 is a side view of the dispenser in FIG. 1.
Figure 3:
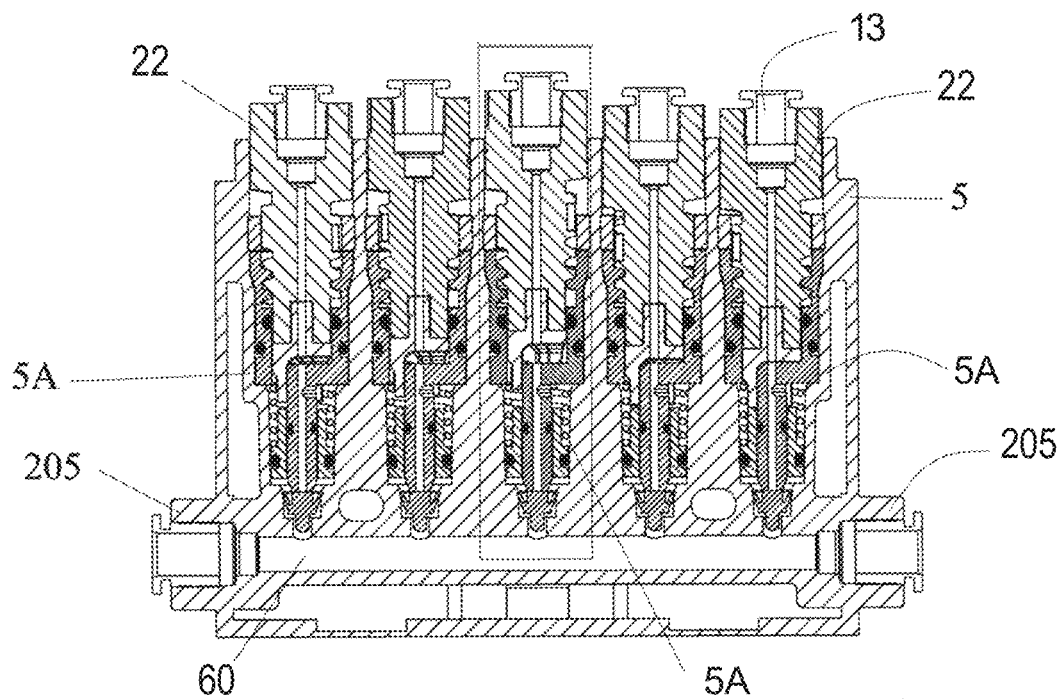
FIG. 3 is a simplified sectional view taken along line III-III in FIG. 2.
Figure 4:
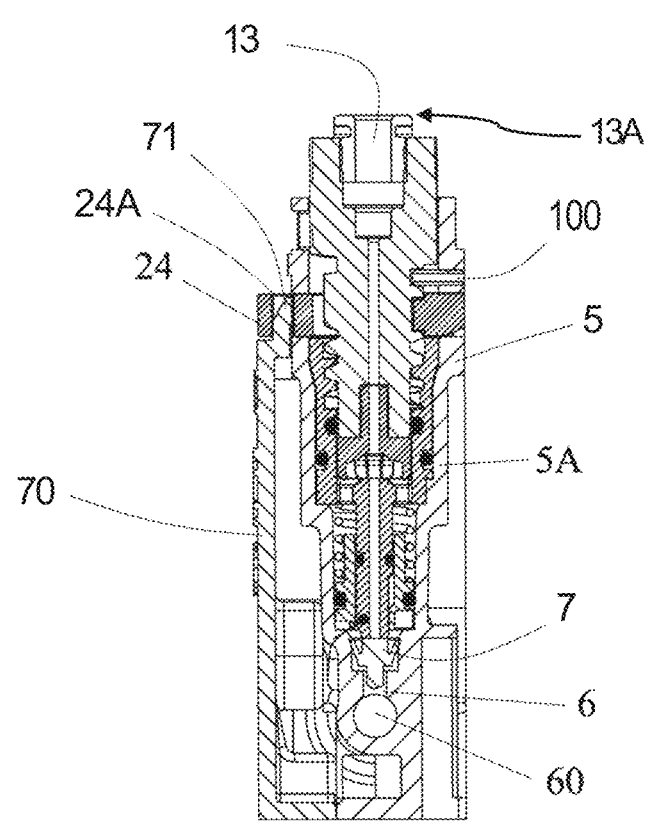
FIG. 4 is a simplified sectional view taken along line IV-IV in FIG. 1.
Figure 5:
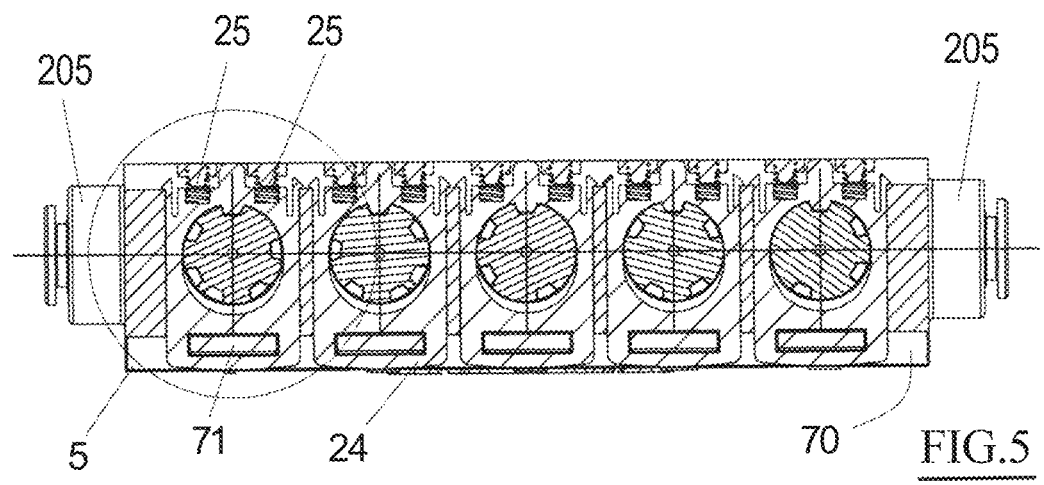
FIG. 5 is a simplified sectional view taken along line V-V in FIG. 1.
Figure 6:
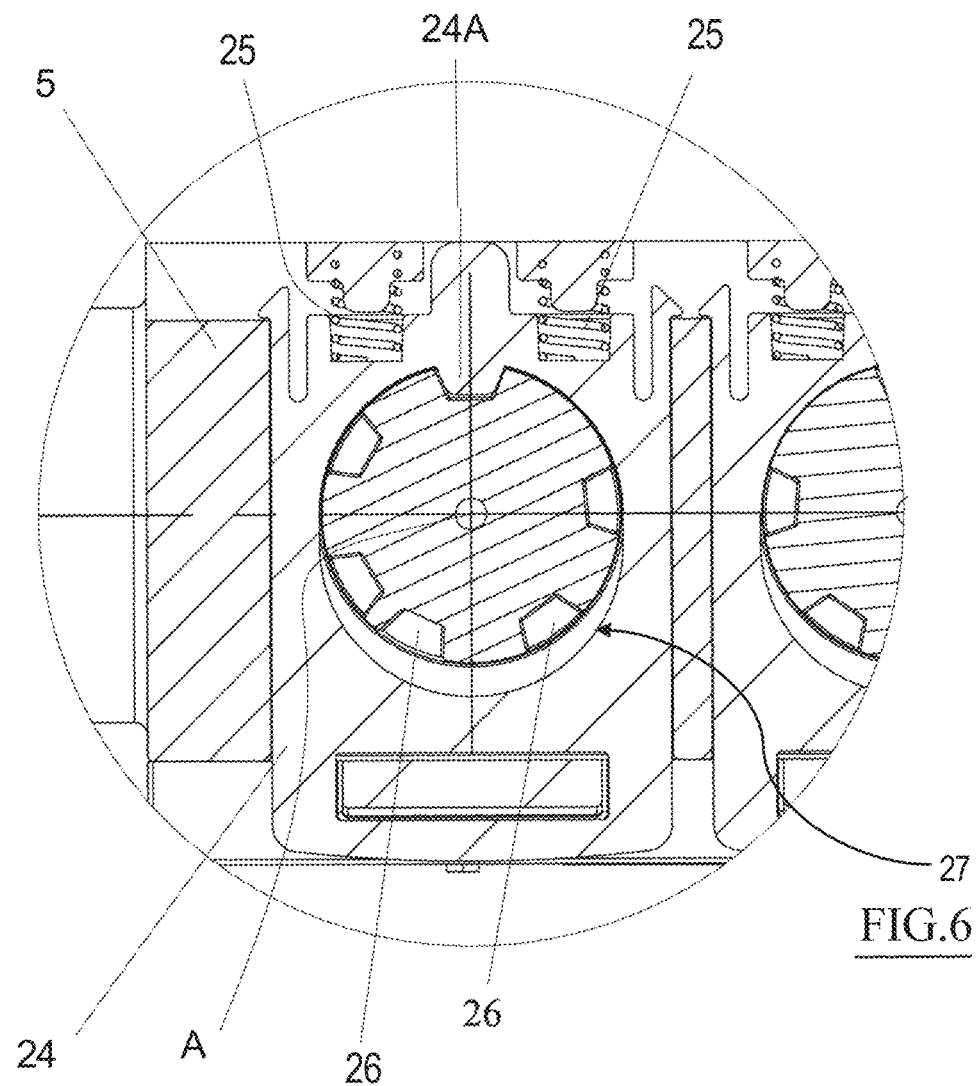
FIG. 6 is an enlargement of the part circled in FIG. 5.

As already mentioned, the dispenser 110 illustrated in FIG. 1 features a frame 5 which defines five cup-shaped bodies 5A, each one belonging to one device 1. The frame can feature more or fewer cup-shaped bodies, depending on the needs.

But obviously the frame can also feature a single cup-shaped body 5A, in order to obtain a totally independent device 1.

There will now follow a description of a single device 1 with reference, for example, to FIG. 7, but this description is also valid for all the devices present in the dispenser 110, of which there can obviously be any number, depending on the needs.

As can be seen in FIG. 7, the supply passage 6 is coupled with a valve element 7.

Axial to the cup-shaped body 5A there is a hollow tubular body 8 endowed with a free end facing the valve element 7.

The cup-shaped body 5A also houses a piston 9 which slides sealingly both along the surface of the cup-shaped body 5A and along an external surface of the hollow tubular body 8.

The seal can be ensured, respectively, by a first O-ring 200 and a second O-ring 201 coupled with the piston and sliding along the surfaces with which they must form the seal.

An elastic element 120 exerts a load against the said piston 9 in the direction of the supply passage 6. Preferably, the elastic element is a simple spiral spring which is sized according to the operating pressures of the device.

The piston 8 delineates, within the cup-shaped body 5A, an accumulation chamber 11 facing the valve element 7 and a dispensing chamber 12 which is in constant communication with the cavity 8A of the hollow tubular body 8.

The cavity 8A of the hollow tubular body 8 is furthermore in communication with a device 1 delivery passage 13.

The valve element 7—which can be made, for example, of a resilient material (for example NBR or FKM-Viton-)—is configured to assume a first position in which the said valve element closes off the free end of the hollow tubular body 8 by abutting thereon and consequently isolating the said cavity 8A from the accumulation chamber 11.

In this first position, the valve element enables communication between the supply passage 6 and the accumulation chamber 11.

The valve element 7 can also assume a second position in which the said valve element isolates the accumulation chamber 11 from the supply passage 6 and enables the passage of lubricant between the accumulation chamber 11 and the cavity 8A.

Essentially, when the lubricant pressure in passage 6 is higher than a certain threshold, the valve element 7 is pushed by the flow of lubricant and by the pressure into the said first position, abutting against the hollow tubular body 8 so as to close the cavity 8A thereof. The pressurised lubricant in the passage 6 flexes (even only slightly) the lip seal 7A and penetrates the accumulation chamber 11, filling the said chamber and simultaneously moving the piston 9 (counter to the elastic element 120) to the stroke end thereof.

When the pressure in the passage 6 drops below a certain threshold, the lubricant in the accumulation chamber 11 is pushed (by the force of the elastic element 120 exerted on the piston 9) towards the valve element 7 which closes off the passage 9 (also due to the inclination of the part forming the lip 7A).

The lubricant present in the accumulation chamber therefore flows into the cavity 8A and fills (through the passage 8B) the dispensing chamber 12 until the piston touches the bottom of the cup-shaped body 5A (or in any case stops travelling in another way, due to a pressure balance).

When the pressure inside the passage 6 is higher than a certain threshold, the accumulation chamber 11 fills again (as described above), and the consequent movement of the piston 9 (towards the top of the figure) dispenses the lubricant present in the dispensing chamber 12 through the cavity 8A of the hollow body 8, up to the delivery passage 13.

According to the invention, the device comprises an adjustable stop 14 which limits the stroke of the piston 9 towards the elastic element 120 to adjust or set to zero the volumetric amount of lubricant dispensed by the device 1.

Indeed, the adjustable stop 14 makes it possible to set the end position of the stroke (towards the elastic element 120) of the piston 9 and therefore the volume of the accumulation chamber 12, on which the amount of lubricant dispensed at each individual cycle depends.

It must be said that the stop can also prevent movement of the piston 9 completely, consequently zeroing out the dispensing amount of the device 1.

The hollow tubular body 8 can extend, preferably as a single piece, from a bottom 21 of a cup-shaped element 20, the said bottom 21 featuring at least one passage P for the said adjustable stop 14 (or for at least one part thereof 14A).

The adjustable stop 14 can feature at least two protruding tabs 14A, preferably three as in the configuration illustrated, each slidingly engaged in a corresponding passage P in the bottom 21 of the cup-shaped body; in practice, the tabs 14A torsionally couple the stop 14 and the cup-shaped element 20. Or rather, by virtue of this torsional coupling, the stop 14 cannot rotate (or rotates only to a limited extent) around the axis thereof.

As can be seen from the drawings, the adjustable stop 14 can have force applied thereto by means of a screw element 22 for adjusting an axial position of said stop 14.

For example, the screw element 22 can be screwed into the said cup-shaped element 20.

Therefore, the screw element 22 features a thread 85 which cooperates with a counter-thread 86 on the cup-shaped element 20.

Advantageously, the screw element 22 can feature knurling Z for the hand-operated movement thereof.

Furthermore, the said screw element can feature an indicator I (notched or screen printed) which shows, for example through a window F envisaged in the frame, the amount of lubricant dispensed based on the position of the screw element 22 (and therefore of the stop 14), shown by the alignment of the indicator I in the window F.

For example, the indicator can be aligned with levels O (OFF), 0.06, 0.10, 0.16 etc, which correspond to the number of millilitres of lubricant dispensable.

To make the movement of the screw element 22 discrete, the said screw element can be functionally coupled with a sliding element 24 perpendicularly to the axis A thereof and movable counter to at least one spring 25 (or, in the case illustrated, two).

The sliding element 24 can be equipped with a tooth 24A configured to engage in one of a plurality of seats 26 envisaged on the screw element 22, for jog adjustment of the position thereof.

Therefore, the screw element can be 'screwed' or 'unscrewed' (to adjust the position of the stop 14), preferably by pressing an accessible part of the sliding element 24 and compressing the springs 25.

Obviously, a mirrored configuration is possible in which the sliding element 24 has a seat, and the screw element a plurality of protrusions.

It is also possible to provide a simple pin 100 (for example a screw) which slides along a specific helical cam made on the screw element 22, which prevents the said screw element 22 coming out totally.

The pin 100, upon abutting one or the other end of the cam, can also act as the stroke limit for the screw element 22 (in a screwing and/or unscrewing direction).

The sliding element 24 can be housed, in a slide-away manner, inside the frame 5A (which can therefore feature lateral runners to enable the said sliding element to slide) and can be endowed with an opening 27 (for example, ellipsoidal in form) inside which the screw element 22 is housed axially.

In this way, when the screw element 22 is inserted into the opening 27, the sliding element 24 cannot come out completely as the screw element 22 acts as a stop.

The sliding element 24 can also act as a stop which keeps the cup-shaped element 20 in position, preventing the latter from coming out of the cup-shaped body 5A.

To complete the description, it must be specified that the cavity 8A can be in communication with an axial passage 29 in the stop 14 and with an axial passage 22A in the screw element 22, which is, in turn, in communication with the said delivery passage 13.

Obviously, the delivery passage 13 can feature a conventional quick coupling 13A.

Suitable O-rings 202 and 203 can be envisaged between the cup-shaped element 20 and the cup-shaped body 5A and between the cup-shaped element 20 and the screw body 22.

Advantageously, the frame 5 can comprise a cover 70 which can be permanently coupled therewith.

The cover 70 can comprise a locking element 71 which secures the sliding element 24 so that, when the cover is permanently coupled with the frame 5, the sliding element 24 is locked in a predetermined position (in which the said sliding element prevents rotation of the screw element 22).

The locking element may be a tongue 71 that fits into an exposed seat 24B in the sliding element.

In the above description, reference is made to a dispenser 110 which includes several devices 1 according to the present invention.

Obviously, the device 1 can also feature a single dispenser configuration.

In this case the frame 5 will delineate a single cup-shaped body 5A, which will be endowed with a passage 6 configured to be placed in communication with a lubricating fluid supply line.

For example, in this case, the frame may feature a means of connection to the said supply line, such as a quick coupling 205 or a single thread configured to couple the device 1 with a manifold, possibly equipped with multiple threaded outlets.

Various embodiments of the innovation have been disclosed herein, but further embodiments may also be conceived using the same innovative concept.

The invention claimed is:

1. A lubricant metering device (1), comprising a frame (5) which defines a cup-shaped body (5A) on the bottom of which a lubricant supply passage (6) is provided, the supply passage (6) being associated with a valve element (7), axially to the cup-shaped body, a hollow tubular body (8) being provided, the tubular body (8) having a free end facing the valve element (7), a piston (9) sealingly sliding in the cup-shaped body (5A) and on an external surface of the hollow tubular body (8), an elastic element (120) loading said piston (9) towards the supply passage (6), the piston (8) defining in the cup-shaped body (5A) an accumulation chamber (11) facing the valve element (7) and a dispensing chamber (12) constantly in communication with a cavity (8A) of the hollow tubular body (8), the cavity (8A) of the hollow tubular body (8) being also in communication with a dispensing passage (13) of the device (1), the valve element (7) being configured to assume a first position in which it closes the free end of the hollow tubular body (8), isolating said cavity (8A) from the accumulation chamber (11) and allowing communication between the supply passage (6) and the accumulation chamber (11) and a second position in which it isolates the accumulation chamber (11) from the supply passage (6) and allows the passage between the accumulation chamber (11) and the cavity (8A), characterized in that it comprises an adjustable stop (14) which limits a stroke of said piston (9) towards said elastic element (120) to adjust or nullify the volumetric quantity of lubricant delivered by the device, wherein the hollow tubular body (8) extends from a bottom (21) of a cup-shaped element (20), the bottom (21) providing at least one passage (P) for a protrusion of the adjustable stop (14).

2. The device according to claim 1, in which the adjustable stop (14) has at least two protruding tabs (14A), each slidingly engaged in a corresponding passage (P) of said bottom (21), the tabs (14A) torsionally coupling the stop (14) and the cup element (20).

3. The device according to claim 1, in which the screw element (22) is screwed into said cup-shaped element (20).

4. The device according to claim 1, wherein the adjustable stop (14) is loaded by a screw element (22) for adjusting a position of said stop (14).

5. The device according to claim 4, wherein the screw element (22) is functionally associated with a sliding element (24) that slides perpendicular to its axis (A) in contrast to at least one spring (25), the sliding element (24) being equipped with a tooth (24A) configured to engage in a plurality of seats (26) of the screw element (22) for a snap adjustment of the position of the screw element (22).

6. The device according to claim 5, in which the sliding element (24) is equipped with an opening (27) in which the screw element (22) is axially housed.

7. The device according to claim 5, in which the frame (5) comprises a cover (70) which can be stably associated with it, the cover comprising a locking element (71) of the sliding element (24) so that, when the cover is firmly associated with the frame (5), the sliding element (24) is locked in a predefined position.

8. The device according to claim 4, wherein the cavity (8A) is in communication with an axial passage (29) of the stop (14) and with an axial passage (22A) of the screw element (22), both in communication with said delivery passage (13).

9. The device according to claim 1, wherein the frame (5) provides a plurality of cup-shaped bodies (5A), each equipped with a relative supply passage (6) in communication with a lubricant supply duct (60), each cup-shaped body (5A) housing a valve assembly (80) comprising at least one valve element (7), a hollow tubular body (8), an elastic element (120), a piston (9), and at least one adjustable stop (14).

10. The device according to claim 1, wherein the frame (5) comprises means for connecting to a supply line, a quick coupling (205) or a thread.

11. The device according to claim 10, wherein the frame (5) comprises only one cup-shaped body (5A) for a single device.

* * * * *